United States Patent [19]

Marechal

[11] Patent Number: 5,788,183

[45] Date of Patent: Aug. 4, 1998

[54] DEVICE FOR ADAPTING THE POSITION OF THE SEAT PROPER FOR A SEAT HAVING A BACK THAT FOLDS DOWN TO A SLEEPING POSITION

[75] Inventor: Robert Marechal, Paris, France

[73] Assignee: Societe Industrielle et Commerciale De Materiel Aeronautique, Issoudun, France

[21] Appl. No.: 687,994

[22] Filed: Jul. 29, 1996

[30] Foreign Application Priority Data

Jul. 27, 1995 [FR] France .................................. 95 09156

[51] Int. Cl.$^6$ ................................................... B64D 11/06
[52] U.S. Cl. ............................ 244/118.6; 244/122 R; 105/316; 297/321; 297/354.13
[58] Field of Search ........................ 244/118.5, 118.6, 244/122 R; 105/315, 316, 322; 297/83, 85, 316, 321, 354.13

[56] References Cited

U.S. PATENT DOCUMENTS

| 2,608,366 | 8/1952 | Jergenson | 244/118.6 |
|---|---|---|---|
| 2,815,794 | 12/1957 | Hendrickson et al. | 297/321 X |
| 3,902,755 | 9/1975 | Sirot | 244/122 R X |
| 4,268,086 | 5/1981 | Okuyama | 297/354.13 X |
| 5,333,818 | 8/1994 | Brandt et al. | 244/118.6 |
| 5,425,516 | 6/1995 | Daines | 105/316 X |
| 5,454,624 | 10/1995 | Anglade et al. | 297/354.13 |

FOREIGN PATENT DOCUMENTS

| 0 628 445 | 12/1994 | European Pat. Off. . |
|---|---|---|
| 2 692 121 | 12/1993 | France . |
| 447 327 | 5/1936 | United Kingdom . |

Primary Examiner—William Grant
Attorney, Agent, or Firm—Young & Thompson

[57] ABSTRACT

A device for a seat, in particular an aircraft seat, the seat having a back that pivots between an upright sitting position and a folded-down sleeping position, the device serving to cause the seat proper of the seat to take up an appropriate position that matches that of the back. The device includes two support-and-drive assemblies designed to be disposed laterally on either side of the seat, each assembly having first and second hinged and deformable mechanical linkages designed to be associated mechanically firstly with the back to pivot relative thereto, and secondly with the seat proper in portions thereof that are respectively proximal and distal relative to the back. The linkages support the seat proper and couple movement of the back and of the seat proper in such a manner that when the back passes from its sitting position to its sleeping position it causes at least an upward movement of the seat proper and that, conversely, when the back moves from its sleeping position to its upright sitting position, it causes at least an opposite downward movement of the seat proper.

41 Claims, 6 Drawing Sheets

DEVICE FOR ADAPTING THE POSITION OF THE SEAT PROPER FOR A SEAT HAVING A BACK THAT FOLDS DOWN TO A SLEEPING POSITION

The invention relates to a device intended for a seat that has a back which can pivot between an upright sitting position and a folded-down, sleeping position, the device ensuring that the seat proper occupies an appropriate position matching the position of the back. The invention also provides a seat having a frame, a back mounted to pivot relative to the frame, a seat proper, and also including such a device.

The seat considered herein is an aircraft seat.

BACKGROUND OF THE INVENTION

Seats of this type need to be able to satisfy various specific requirements relating to safety, weight, cost, durability, and the ability to withstand difficult conditions of use.

For passengers, there is also a requirement of being able to incline the back. In general, this is through a few degrees only.

Seats are already known for aircraft passengers where it is possible to fold the back down to a position that is close to horizontal.

However, there then arises a problem concerning the positioning of the seat proper relative to the back.

OBJECTS AND SUMMARY OF THE INVENTION

The invention seeks to solve this problem in the special case of an aircraft seat that needs to satisfy the above-mentioned requirements.

To this end, and in a first aspect, the invention provides a device of the kind mentioned above that comprises two support-and-drive assemblies designed to be disposed laterally on either side of the seat.

Each assembly comprises first and second hinged and deformable mechanical means designed to be associated mechanically firstly with the back to pivot relative thereto, and secondly with the seat proper in portions thereof that are respectively proximal and distal relative to the back, the function thereof being firstly to support the seat proper and secondly to couple movement of the back and of the seat proper. In this manner, when the back passes from its upright sitting position to its sleeping position it causes at least an upward movement of the seat proper and, conversely, when the back moves from its sleeping position to its upright sitting position, it causes at least an opposite downward movement of the seat proper.

This up/down movement is larger towards the front of the seat away from the back than it is towards the rear of the seat near the back.

According to another characteristic, the first and second means of each of the two assemblies have the function of coupling movement of the back and of the seat proper in such a manner that when the back moves from its upright sitting position to its sleeping position it also causes a combined movement of the seat proper generally towards the back, and that, conversely, when the back moves from its sleeping position to its upright sitting position, it causes the seat proper to move oppositely away from the back.

In general, the first and second means of each of the two respective assemblies comprises two links hinged to each other at their first end portions about second and fourth axes, a first link being designed to be hinged at its second end portion to the back about first axes and a second link being designed to be hinged to the seat proper about second and fifth axes, one of the two links being designed to be hinged to a portion of the seat that belongs to the frame about third and sixth axes. Each of these links may comprise a single piece or may be made up of a plurality of pieces.

According to other characteristics, the first means of each of the two sets comprise two links hinged to each other at their first end portions about the second axis. A first link is designed to be hinged at its second end portion to the back about the first axis. A second link is designed to be hinged at its second end portion to a portion of the seat belonging to the frame about the third axis. Both links are hinged to the seat proper about the second hinge axis between their first end portions. This second hinge axis slides in the plane of the seat proper.

According to the invention, both links of each of the first means are rectilinear or substantially rectilinear and form a deformable scissor-like linkage interposed between the back and a portion of the seat belonging to the frame.

The second means of each of the two sets comprise two links hinged to each other at their two first end portions about the fourth axis. A long first link is designed to be hinged at its second end portion to the back about the first axis. A short second link is designed to be hinged firstly at its second end portion to the seat proper about the fifth axis and secondly in a middle portion thereof to a portion of the seat belonging to the frame about the sixth axis.

More particularly, the second link is hinged to the middle portion of the frame-forming portion of the seat. Also, the fifth hinge axis between the second link and the seat proper does not slide.

In a second aspect, the invention provides a seat, and more particularly an aircraft seat, having a frame, a back pivotally mounted on the frame about a main axis, and a seat proper which also includes a device of the kind specified above. The device is substantially located beneath the seat proper.

According to other characteristics, the back is hinged to the frame above the seat proper and is extended, beyond its main hinge axis by two side plates, situated laterally on either side of the seat, to which there hinge the first and second means of each of the two support-and-drive assemblies about the first axis which is common. These side plates are of a length such that in the seat position, the first axis of the first and second means is situated in the vicinity of the plane of the seat proper, and in particular slightly above it.

The seat proper is supported solely by the two support-and-drive assemblies. It is provided with two downwardly-directed lateral flanges adjacent to the wall of the seat proper, and in the two flanges and in the portion close thereto it includes two slots, slideways, or the equivalent co-operating with the second hinge axis of the first means, namely the hinge axis between the two links thereof.

The seat proper also supports two flanges via two downwardly-directed lug-shaped projections and in its distal portion it includes a fifth hinge axis of the second means.

This fifth hinge axis is carried by the two lateral flanges.

According to other characteristics, the third hinge axis between the first means and the frame-forming portion of the seat is situated beneath and substantially vertically beneath the first hinge axis between the first means and the back when in the sleeper position.

When in the sleeper position, the two links of the first means form an angle of about 130° to about 160°, and in particular an angle in the vicinity of 145°, and when in the upright seat position, they form an angle of about 30° to about 70°, and in particular an angle in the vicinity of 50°.

The two links of the first means are situated substantially symmetrically about the plane of the seat proper.

The fourth hinge axis between the two links of the second means is situated beneath and substantially vertically beneath the sixth hinge axis between the second means and the frame.

The fourth hinge axis of the two links of the second means is situated behind and in front of the vertical from the sixth hinge axis between the second means and the frame in the upright seat position and in the sleeper position, respectively.

The third and sixth hinge axes between the first and second means and the frame are situated in the vicinity of a common horizontal plane.

The second hinge axis of the first means is situated at a lower level and the fifth hinge axis of the second means is situated at a higher level.

The sixth hinge axis between the second means and the frame is situated substantially vertically beneath the middle portion of the seat proper.

The second link of the second means is angled in the range about 90° to 130°, and in particular in the vicinity of 110°.

The fifth hinge axis between the second means and the seat proper is situated in front of the fourth hinge axis between the two links or the sixth hinge axis between the second means and the frame.

The second link of the second means, in the upright seat position, extends in part substantially parallel to the plane of the seat proper.

The pivoting stroke of the back between the upright seat position and the sleeper position is about 60° to about 90°, and in particular is about 70°.

The up/down movement of the seat proper is three to four times larger towards the front than towards the back, the seat proper thus having a rotary movement of the order of a few degrees.

In one possible embodiment, the seat further includes a leg/foot rest made up of one or more hinged-together portions hinged to the seat proper towards the front thereof.

Also, the seat includes cushions for the seat proper and for the back.

Thus, according to the invention, the back of the seat is substantially horizontal in the sleeper position.

BRIEF DESCRIPTION OF THE DRAWINGS

Other advantages of the invention appear from the following description made with reference to the accompanying drawings given as non-limiting examples.

MORE DETAILED DESCRIPTION

An aircraft seat of the invention comprises A frame 1 that includes in particular a leg assembly, a back 2, and a seat proper 3.

The back 2 and the seat proper 3 include strength members and in particular respective walls 4 and 5 to which respective cushions 6 and 7 are secured.

Unless specified otherwise, when referring to the back 2 and to the seat proper 3, reference is being made essentially to the strength members thereof.

In the embodiment shown, the aircraft seat further comprises, hinged towards the front of the seat proper 3, a leg/foot rest 8 having a plurality of mutually hinged portions, in particular three successive portions 8a, 8b, and 8c, respectively.

The term "front" or "forwards" refers to an aircraft seat in its normal position of use. The same applies to other terms such as "rear", "rearwards", "up", "down", "above", "below", "horizontal", "vertical", etc.

The aircraft seat may also include one or more lateral arms 9, a front table 10, a table behind the back, and all the other conventional accessories.

The term "lateral" designates that which is situated on either side of the seat.

In the embodiment shown, the frame includes two strong tubular spars extending horizontally and transversely beneath the seat proper 3, respectively towards the front 11 and towards the rear 12.

In general, the two spars 11 and 12 are common to a plurality of aircraft seats placed side by side.

The two spars extend perpendicularly to the vertical plane of symmetry of the aircraft seat that is parallel to the planes of FIGS. 1 to 5.

The back 2 is carried by and hinged to the frame 1 about a horizontal and transverse axis 13.

The axis 13 is situated above the level of the seat proper 3. It is offset rearwards slightly relative to the seat proper 3.

The axis 13 is carried at the top end of two lateral cheek pieces 14 that are generally in the form of upwardly-directed curvilinear triangles carried by the rear spar 12 and forming parts of the frame 1.

To this end, the frame 2 includes two lateral side plates 15 fixed rigidly to the wall 4 and extending beyond said wall 4.

Beyond the axis 13, the back 2 is extended by two side plates 15 of adequate length.

At their end portions remote from the wall 4, the side plates 15 support an axis 16 for the device 17 with which the aircraft seat is provided.

Figure 3:
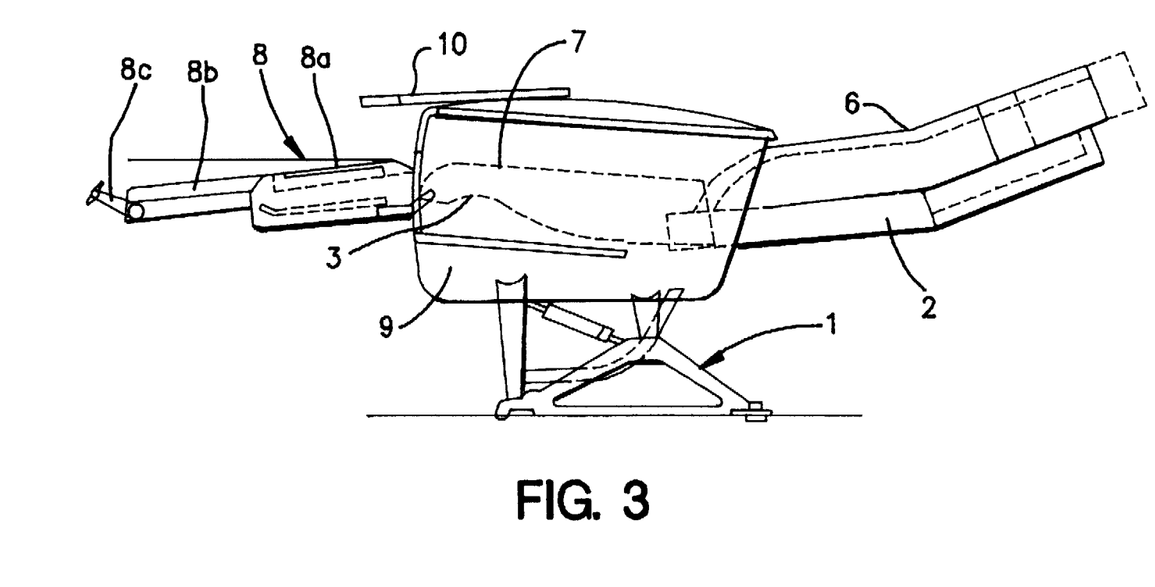
Figure 4:
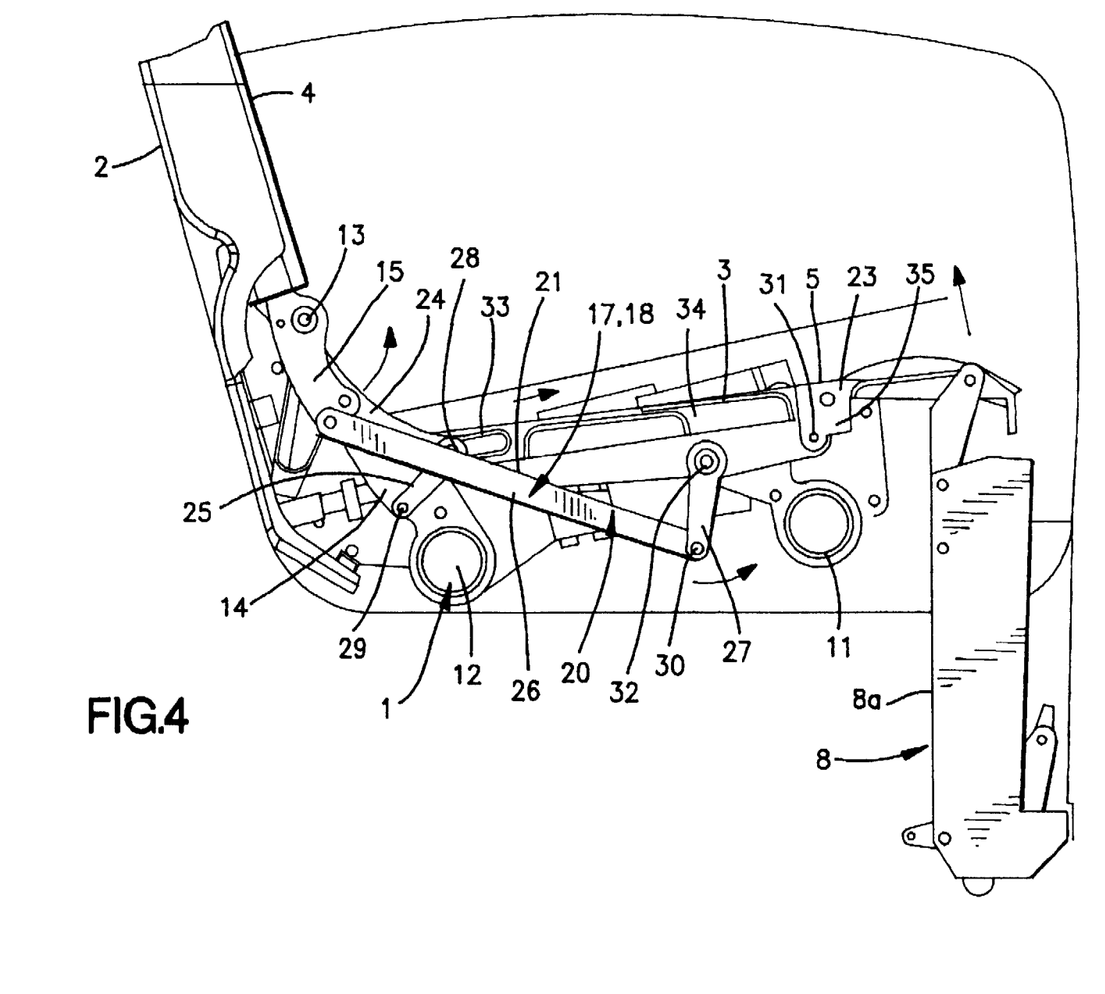
FIGS. 4 and 5 are two fragmentary diagrammatic side views on a larger scale showing the seat and the device with which it is fitted respectively in the upright sitting position and in the folded-down, sleeping position. The cushions have been omitted to facilitate understanding.
Figure 5:
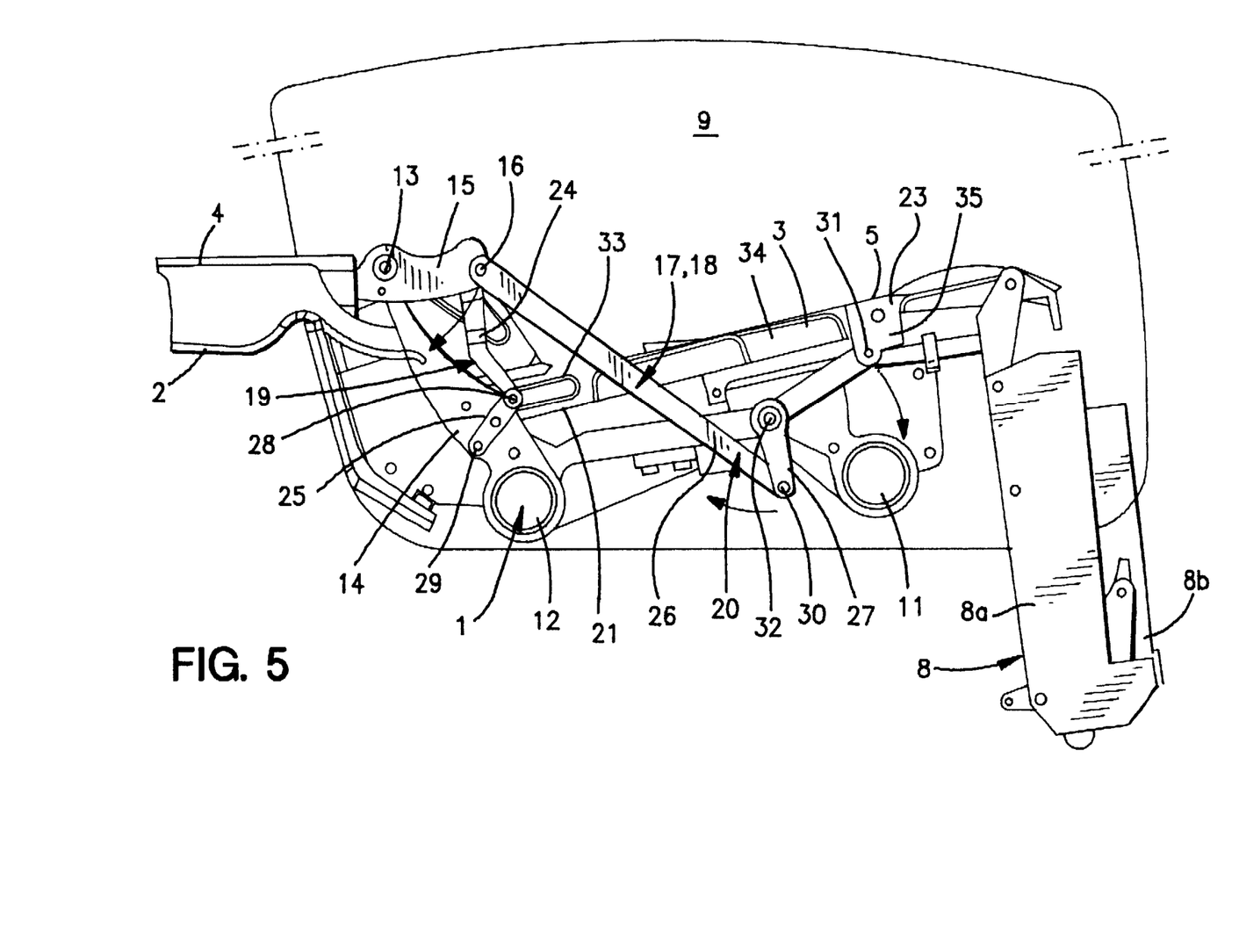
Figure 6:
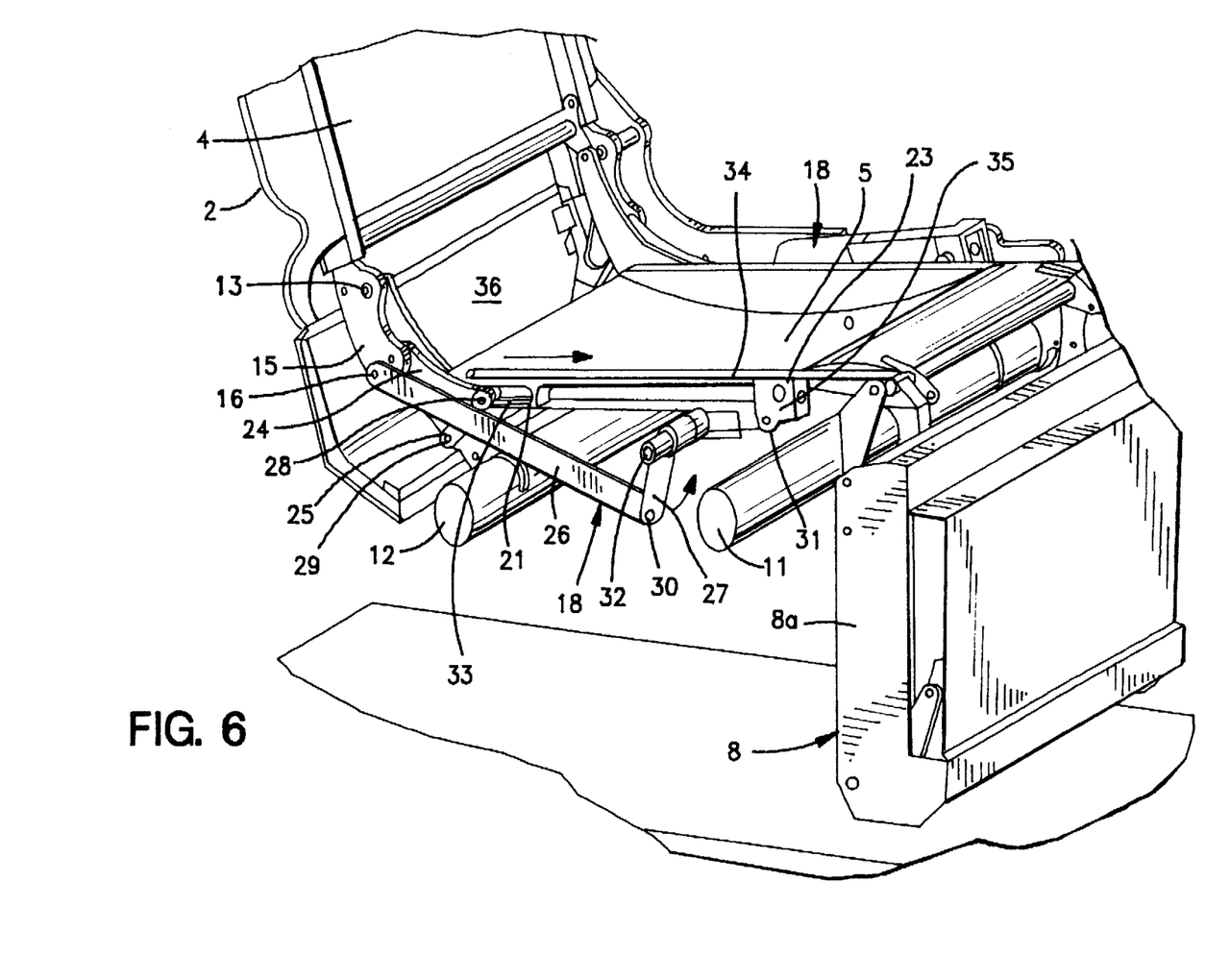
FIGS. 6 and 7 are two fragmentary perspective views showing the seat in the positions of FIGS. 4 and 5 respectively.
Figure 7:
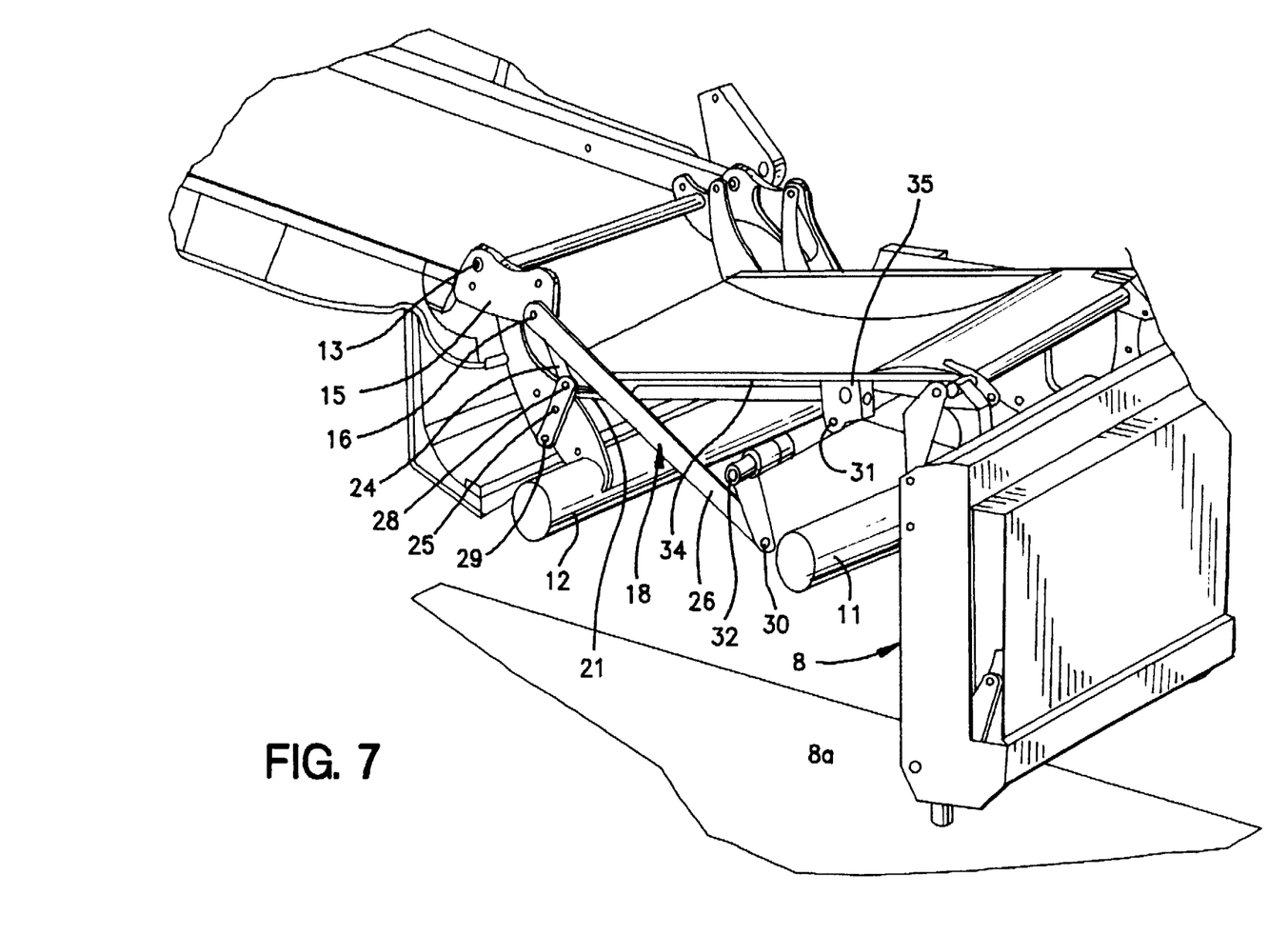

In normal use, the back 2 is likely to take up two extreme positions, respectively an upright sitting position (FIGS. 1, 4, and 6) and a folded-down, or "sleeping", position (FIGS. 3, 5, and 7).

In the upright sitting position, the back 2 extends upwardly and substantially vertically, and in a typical disposition it is slightly inclined, rearwards, with at least the bottom portion of the wall 4 being at an angle of about 18° relative to the vertical.

In this upright sitting position, in the embodiment shown, the seat proper 3 is at an angle of about 90° to the vertical.

In the sleeping position, the back 2 is substantially horizontal and extends rearwards.

In the embodiment shown, the wall 4 is at an angle of about 86° to the vertical.

The device 17 is such that the seat proper 3 takes up an appropriate position matching that of the back 2.

In the present case and as shown, the seat 3 is then at an angle of about 85° to the vertical.

Figure 1:
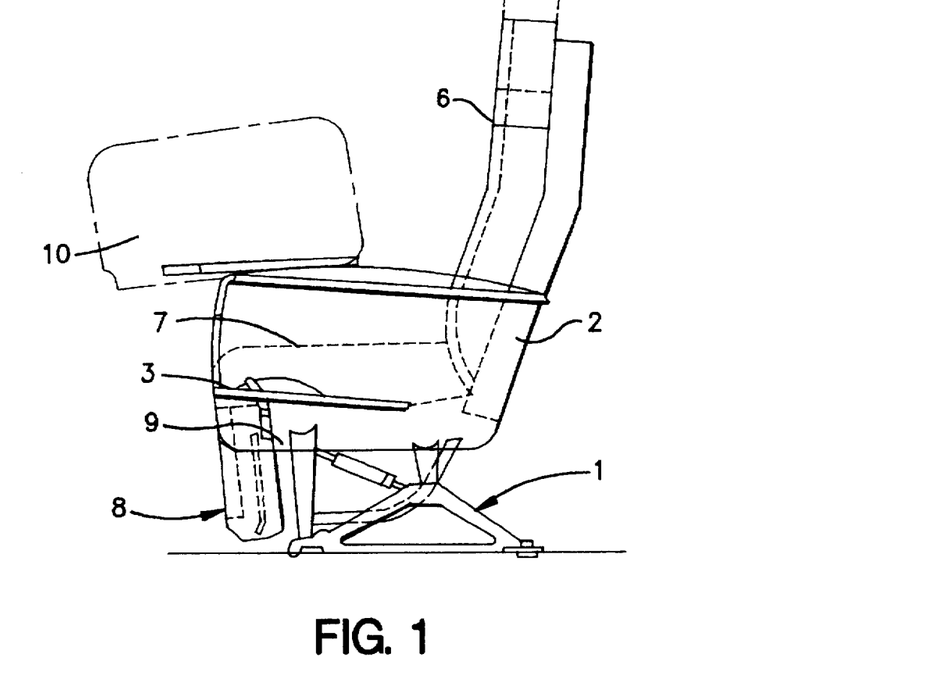
FIGS. 1, 2, and 3 are three diagrammatic side views showing an aircraft seat of the invention respectively in an upright sitting position, in an inclined seat position, and in a folded-down, sleeping position.
Figure 2:
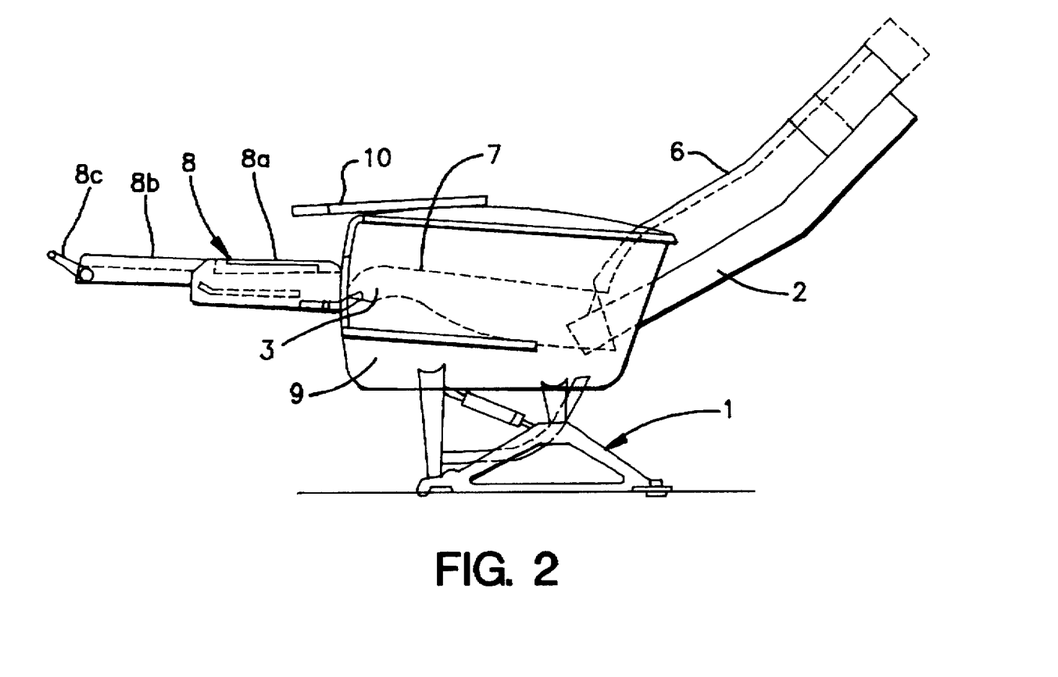

The aircraft seat can also take up an intermediate position in which the back 2 is inclined between its upright position and its folded-down position (FIG. 2).

The device 17 comprises two support-and-drive assemblies 18 designed to be disposed laterally on either side of the aircraft seat. These two assemblies 18 are similar. That is why only one of them is described in detail, the two assemblies being disposed symmetrically relative to each other about the vertical plane of symmetry of the seat.

Each assembly 18 comprises first and second hinged and deformable mechanical means given respective references 19 and 20, and designed to be mechanically associated firstly with the back 2 to pivot about a first axis 16 which is common to both means 19 and 20, and secondly with the seat proper 3 respectively in its proximal (i.e. rear) portion 21 and its distal (i.e. front) portion 23, relative to the back 2. The function of the two sets 18 of means 19 and 20 is firstly to support the seat proper 3 and secondly to couple together movements of the back 2 and of the seat proper 3 in such a manner that when the back 2 moves from its upright sitting position to its sleeping position it causes the seat proper 3 at least to move upwards, and conversely when the back 2 moves from its sleeping position to its upright sitting position, it causes the seat proper to move in the opposite or downwards direction.

The function of the first and second means 19 and 20 is to couple movements of the back 2 and of the seat proper 3 in such a manner that moving the back 2 from its upright position to its sleeping position also causes a combined movement whereby the seat 3 moves generally closer to the back 2, and conversely, when the back 2 moves from its sleeping position to its upright sitting position, it causes an opposite movement of the seat proper 3 away from the back.

The up/down movement of the seat proper 3 is greater towards the front of the seat (remote from the back 2) than towards the rear thereof (close to the back 2).

For a pivotal stroke of the back 2 from its upright sitting position to its sleeping position lying in the range about 60° to about 90°, and particularly being about 70°, the up/down movement of the seat proper 3 is two to four times greater near the front thereof than towards the rear thereof, the seat proper rotating through a few degrees, and in particular through about 6°.

The first means 19 of each assembly 18 comprise first and second links 24 and 25 respectively.

The second means 20 likewise comprise first and second links 26 and 27 respectively.

These links 24, 25, 26, and 27 are rigid, single-piece, or made out of a plurality of pieces. They extend in directions parallel to the vertical plane of symmetry of the aircraft seat.

The first means 19 of each assembly 18 are now described in more detail.

The two links 24 and 25 are hinged together at their first end portions about a horizontal and transverse second axis 28.

The first link 24 is hinged at its second end portion to the back 2 about the first axis 16.

The second link 25 is hinged at its second end portion to the frame 1 about a horizontal transverse third axis 29.

Both the first and the second links 24 and 25 are hinged to the seat proper 3 in a portion thereof close to its back 21 about the second axis 28. This hinge is mounted to slide longitudinally in a forwards-rearwards (or reverse) direction, i.e. in the plane of the seat proper 3.

The two links 24 and 25 form a deformable scissor-like linkage interposed between the back 2 and the frame 1 serving to support and drive the seat proper 3.

Both links 24 and 25 are rectilinear or substantially rectilinear and relatively short.

The second means 20 of each assembly 18 are now described more particularly.

The two links 26 and 27 are hinged to each other at their two first end portions about a horizontal and transverse fourth axis 30.

The second end portion of the first link 26 is hinged to the back 2 about the first axis 16.

The second end portion of the second link 27 is hinged to the front or distal portion 23 of the seat proper 3 about a horizontal and transverse fifth axis 31. This hinge does not slide longitudinally in the manner of the axis 28.

The second link 27 is also hinged in its middle portion to the frame 1 about a horizontal and transverse sixth axis 32.

The two links 26 and 27 form two levers interposed between the back 2 and the seat 3, using the frame 1 as a fulcrum.

The first link 26 is rectilinear or substantially rectilinear and is longer than the second link 27 which forms a crank and is hinged to the frame 1 in its angled middle portion. The angle formed in this way is about 90° to 130°, and in particular is in the vicinity of 110°.

As can be seen from the above, the seat proper 3 is not supported directly by the frame 1 but indirectly and solely by the two assemblies 18.

To this end, the proximal portion 21 of the seat proper 3 includes two slots, slideways, or the equivalent 33 co-operating with the second axis 28 of the first means 19 and with the two links 24 and 25.

These slots, slideways, or the equivalent 33 serve to enable the axis 28 to move relative to the seat proper parallel or substantially parallel to the plane of the wall 5.

Where appropriate, the axis 28 may be provided with wheels or the equivalent so as to facilitate sliding.

The length of the slots, slideways, or equivalent is sufficient to allow the axis 28 to move through the desired distance.

The wall 5 of the seat proper is provided on either side with two adjacent lateral flanges 34 that are downwardly directed and that extend parallel or substantially parallel to the wall 5.

The slots, slideways, or equivalent 33 are disposed towards the back in each of the two flanges 34.

Towards the front, the two flanges 34 have two lug-shaped projections 35 that are likewise downwardly directed and that support the hinge axis 31.

The axes 13, 29, and 32 are fixed and carried by the frame 1.

In transverse elevation on a plane parallel to the longitudinal plane of symmetry of the aircraft seat, these three axes define an obtuse triangle whose apex is defined by the third axis 29, that has an angle of about 120°. The side of the triangle defined by the third and sixth 29 and 32 is substantially horizontal or slopes slightly relative to the horizontal, since the two axes 29 and 32 are situated in the vicinity of the same horizontal plane, and the sixth axis 32 is generally a little higher than the axis 29.

The axes 16, 28, 30, and 31 define a quadrilateral that is deformable both in shape and in position. The two opposite short sides of the quadrilateral as defined respectively by the first and second axes 16 & 28 and by the fourth and fifth axes 30 & 31 are of constant length, unlike the two opposite long sides defined respectively by the axes 16 & 31, and by the axes 28 & 30.

At least in the upright seat position, the device 17 is substantially located beneath the seat proper 3, the side plates 15 being of a length such that in the upright seat position, the axis 16 of the first and second means 19 and 20 is situated close to the plane of the seat proper 3 as defined by the wall 5. In the embodiment shown, when the seat is in its upright position, the axis 16 is slightly above said plane.

Thus, as can clearly be seen in FIGS. 6 and 7, there exists an empty space 36 towards the rear and below the walls 4 and 5 of the aircraft seat serving both as clearance for the component parts of the device 17 and of the seat, and also as means for securing the cushions 6 and 7.

In the sleeper position, the device 17 is located in part beneath the seat proper 3 (towards the front), and in part above it (towards the rear). Nevertheless, that does not matter since the device 17 is located laterally and remains within the thickness of the cushions 6 and 7.

Consequently, under all circumstances, the device 17 is invisible or substantially invisible, providing the cushions 6 and 7 are in place.

In the sleeper position, the axes 16, 28, and 29 are situated substantially vertically one above the other, with the axis 16 on top, the axis 29 at the bottom, and the axis 28 between them.

In the upright sitting position, the first and second axes 16, 28, and 29 define a triangle, with the axis 16 being the rearmost and the highest, with the axis 28 being the furthest forwards, and with the third axis 29 being the lowest.

The two links 24 and 25 of the first means 19 form an angle of about 130° to 160°, and in particular an angle close to 145° when the seat is in its sleeper position, and when it is in its upright seat position may form an angle of about 30° to 70°, and in particular an angle close to 50°. These two links 24 and 25 are disposed substantially symmetrically on either side of the plane of the seat proper 3 as defined by the wall 5.

The fourth axis 30 between the two links 26 and 27 of the second means 20 is situated beneath and substantially vertically beneath the sixth axis 32 between the second means 20 and the frame 1.

More precisely, the axis 30 is situated respectively behind or in front of the vertical through the hinge axis 32 depending on whether the seat is in its upright position or its sleeper position.

Since the seat proper 3 slopes downwards from front to rear, the second axis 28 of the first means 19 is situated at a lower level and the fifth axis 31 of the second means 20 at a higher level.

The sixth axis 32 between the second means 20 and the frame 1 is situated substantially vertically in line with the middle portion of the seat proper 3 between the second and fifth axes 28 and 31, and thus between the projections 35 and the slots, slideways, or equivalent 33.

The fifth axis 31 between the second means 20 and the seat proper 3 is situated in front of the fourth axis 30 between the two links 26 and 27 or the sixth axis 32 between the second means 20 (i.e. the second link 27) and the frame 1.

The operation of the device 17 and of the seat is now described, starting from the upright sitting position.

In this position, the scissors-like linkage formed by the two links 24 and 25 is at its most closed, with the second axis 28 being situated somewhat in front of the slots, slideways, or equivalent 33.

The link 26 is then at its closest to being horizontal. The link 27 is pivoted downwards and forwards, its portion extending between the axes 32 and 31 extending substantially parallel to the plane of the seat proper as defined by the wall 5.

By acting on a knob situated in particular on the arm of the seat, the user can then cause the back 2 to be inclined in a rearwards direction.

The back 2 passes through the intermediate position shown in FIG. 2 on its way to the sleeping position.

As the back 2 is moved by pivoting, the device 17 serves to ensure appropriate displacement of the seat proper 3 as already mentioned.

In the sleeping position, the side plate 15 and the link 26 occupy a low position that is substantially symmetrical to the high position they occupy in the upright sitting position.

In the sleeping position, the scissors-link linkage 24, 25 is at its widest open, with the axis 28 being situated somewhat behind the slots, slideways, or equivalent 33.

The link 26 is then more inclined relative to the horizontal. The link 27 is pivoted upwards and rearwards.

These movements are represented in FIGS. 4 and 5 by arrows.

I claim:

1. A device for a seat having a seat proper and a back that pivots between an upright sitting position and a folded-down sleeping position, the device causing the seat proper to take up a position that corresponds to that of the back, the device comprising two support-and-drive assemblies constructed to be disposed laterally on either side of the seat, each of said assemblies comprising first and second hinged and deformable mechanical means for supporting the seat proper and coupling movement of the back and of the seat proper so that when the back passes from the sitting position to the sleeping position the device causes at least an upward movement of the seat proper that is greater toward a front of the seat proper remote from the back than toward a rear of the seat proper close to the back, and so that when the back moves from the sleeping position to the sitting position, the device causes at least an opposite downward movement of the seat proper, said hinged and deformable mechanical means being mechanically connected with the seat back to pivot relative thereto and with the seat proper in portions thereof that are respectively proximal and distal relative to the back.

2. The device according to claim 1, wherein said first and second means are further for coupling movement of the back and of the seat proper so that when the back moves from the sitting position to the sleeping position the device causes a combined movement of the seat proper generally towards the back, and so that when the back moves from the sleeping position to the sitting position, the device causes the seat proper to move away from the back.

3. The device according to claim 1, wherein each of said first and second means each of the two respective assemblies comprises two links hinged to each other at their first end portions about second and fourth axes respectively, first said links of each of said first and second means being hinged at their second end portions to the back about a first axis and second said links of each of said first and second means being hinged to the seat proper about the second and a fifth axis respectively, and hinged to a frame for the seat about third and sixth axes respectively.

4. The device according to claim 3, wherein said second axis is slidable in the plane of the seat proper.

5. The device according to claim 3, wherein said two links of said first means are substantially rectilinear.

6. The device according to claim 3, wherein said two links of said first means form a deformable scissor-link linkage between the back and the frame for the seat.

7. The device according to claim 3, wherein said fifth axis does not slide.

8. The device according to claim 3, wherein said first link of said second means is rectilinear and longer than said second link thereof which is angled.

9. The device according to claim 8, wherein said second link of said second means is hinged to the frame for the seat at a middle and angled portion of said second link.

10. The device according to claim 3, wherein each of said first and second links of said first and second means comprises at least a single piece.

11. An aircraft seat having a seat proper and a back that pivots between an upright sitting position and a folded-down sleeping position and a device causing the seat proper to take up a position that corresponds to the back, the device comprising two support-and-drive assemblies constructed to be disposed laterally on either side of the seat, each of said assemblies comprising first and second hinged and deformable mechanical means for supporting the seat proper and coupling movement of the back and of the seat proper so that when the back passes from the sitting position to the sleeping position the device causes at least an upward movement of the seat proper that is great toward a front of the seat proper remote from the back than toward a rear of the seat close to the back, and so that when the back moves from the sleeping position to the sitting position, the device causes at least an opposite downward movement of the seat proper, said hinged and deformable mechanical means being mechanically connected with the seat back to pivot relative thereto and with the seat proper in portions thereof that are respectively proximal and distal relative to the back, wherein each of said first and second means comprises two links hinged to each other at their first end portions about second and forth axes respectively, first said links of each of said firsthand second means being hinged at their second end portions to the back about a first axis and second said link of each of said first and second means being hinged to the seat proper about a second and a fifth axis respectively, and hinged to a frame of the seat about third and sixth axis respectively.

12. The seat according to claim 11, wherein the back is hinged to the frame for the seat above the seat proper and has two side plate extensions situated laterally on either side of the seat, which support-and-drive assemblies about the first axis which is carry said first axis.

13. The seat according to claim 12, wherein said side plates are of a length such that in the sitting position, said first axis is close to a plane of the seat proper.

14. The seat according to claim 11, wherein the seat proper is supported solely by said two support-and-drive assemblies.

15. The seat according to claim 11, wherein the seat proper includes two slot means in its proximal portion for slideably mounting said second axis of said first means.

16. The seat according to claim 11, wherein said two slot means are in two lateral flanges on the seat proper and extend substantially parallel to the seat proper.

17. The seat according to claim 16, wherein said two flanges extend downwards.

18. The seat according to claim 16, wherein said fifth axis is in a distal portion of the seat proper, and is carried by said two lateral flanges.

19. The seat according to claim 18, wherein each of said flanges includes a downwardly-directed lug-shaped projection in which said fifth axis is located.

20. The seat according to claim 11, wherein said fifth axis is in a distal portion of the seat proper.

21. The seat according to claim 14, wherein, at least in the upright seat position, the device is located substantially beneath the seat proper.

22. The seat according to claim 11, wherein said third axis is substantially vertically beneath said first axis when the back is in the sleeping position.

23. The seat according to claim 11, wherein, when in the sleeping position, said two links of said first means form an angle of about 130° to about 160°, and, when in the sitting position form an angle of about 30° to about 70°.

24. The seat according to claim 11, wherein said two links of said first means are substantially symmetrical about a plane of the seat proper.

25. The seat according to claim 11, wherein said fourth axis is substantially vertically beneath said sixth axis.

26. The seat according to claim 23, wherein said fourth axis is behind and in front of the vertical from said sixth axis in the upright seat position and in the sleeping position, respectively.

27. The seat according to claim 11, wherein said third and sixth axes are in the vicinity of a common horizontal plane.

28. The seat according to claim 27, wherein said second axis of said first means is at a lower level than said fifth axis.

29. The seat according to claim 11, wherein said sixth axis is substantially vertically beneath a middle portion of the seat proper.

30. The seat according to claim 11, wherein said second link of said second means is angled in the range of about 90° to 130°.

31. The seat according to claim 11, wherein said fifth axis is in front of at least one of said fourth axis and said sixth axis.

32. The seat according to claim 11, wherein said second link of said second means, in the sitting position, extends in part substantially parallel to a plane of the seat proper.

33. The seat according to claim 11, wherein a pivoting stroke of the back between the sitting position and the sleeping position is about 60° to about 90°.

34. The seat according to claim 33, wherein vertical movement of the seat proper is three to four times larger towards the front than towards the rear.

35. The seat according to claim 11, wherein the seat proper performs a rotary movement of the order of a few degrees.

36. The seat according to claim 11, further including a leg/foot rest comprising one or more hinged-together portions hinged to the seat proper towards the front thereof.

37. The seat according to claim 11, further comprising cushions for the seat proper and for the back.

38. The seat according to claim 11, wherein, in the sleeping position, the back is substantially horizontal.

39. A device for adjusting a seat that is pivotable between a folded-down sleeping position and an upright sitting position, the seat having a frame, a seat proper and a back, the device comprising:

a first linkage comprising first and second links (24, 25) hinged to each other and to the seat proper at their first ends about a second axis (28), said first link being hinged to the back at its second end about a first axis (16) and said second link being hinged to the frame at its second end about a third axis (29); and a second linkage comprising third and fourth links (26, 27) hinged to each other at their first ends about a fourth axis (30), said third link being hinged to the back at its second end about said first axis (16) and said fourth link being hinged to the seat proper at its second end about a fifth axis (31) and to said frame about a sixth axis (32), said first and second linkages being arranged to elevate the seat proper when the seat is changed from the sitting position to the sleeping position and to lower the seat proper when the seat is changed from the sleeping position to the sitting position.

40. The device of claim 39, wherein said first and second linkages are arranged to elevate a front of the seat proper more than a rear of the seat proper when the seat is changed from the sitting position to the sleeping position.

41. A seat that is pivotable between a folded-down sleeping position and an upright sitting position, the seat comprising:

a seat proper;

a back;

a frame for said seat proper and said back;

a first linkage comprising first and second links; and a second linkage comprising third and fourth links, said first and second linkages being arranged to elevate a front of said seat proper more than a rear of said seat proper when the seat is changed from the sitting position to the sleeping position and to lower a front of said seat proper more than a rear of said seat proper when the seat is changed from the sleeping position to the sitting position, wherein said first and second links are hinged to each other and to said seat proper at their first ends about a second axis, said first link being hinged to said back at its second end about a first axis and said second link being hinged to said frame at its second end about a third axis, and wherein said third and fourth links are hinged to each other at their first ends about a fourth axis, said third link being hinged to said back at its second end about said first axis and said fourth link being hinted to said seat proper at its second end about a fifth axis and to said frame about a sixth axis.

* * * * *